United States Patent [19]

Hoffman

[11] Patent Number: 4,544,048

[45] Date of Patent: Oct. 1, 1985

[54] MAGNETIC FRICTION DEVICE

[75] Inventor: David L. Hoffman, Waukesha, Wis.

[73] Assignee: General Electric Company, Schenectady, N.Y.

[21] Appl. No.: 514,321

[22] Filed: Jul. 15, 1983

Related U.S. Application Data

[62] Division of Ser. No. 263,663, May 14, 1981, Pat. No. 4,417,356.

[51] Int. Cl.[4] .......................................... F16D 69/02
[52] U.S. Cl. ............................. 188/251 A; 188/73.2; 188/80; 188/83; 188/267; 192/84 PM
[58] Field of Search ...................... 188/73.1, 73.2, 80, 188/83, 267, 251 A, 381; 192/84 PM, 107 M; 428/425.9, 463, 900; 523/149, 502; 378/181

[56] References Cited

U.S. PATENT DOCUMENTS

| | | | |
|---|---|---|---|
| 1,780,194 | 11/1930 | Kende | 188/83 |
| 3,085,407 | 4/1963 | Tomlinson | 192/84 PM |
| 3,247,017 | 4/1966 | Eichler et al. | 428/425.9 |
| 4,049,985 | 9/1977 | Sudler | 188/267 X |
| 4,417,356 | 11/1983 | Hoffman | 378/181 |

FOREIGN PATENT DOCUMENTS 1075903  2/1960  Fed. Rep. of Germany ........ 192/84 PM Primary Examiner—Bruce H. Stoner, Jr.
Assistant Examiner—Richard R. Diefendorf
Attorney, Agent, or Firm—Fuller, House & Hohenfeldt

[57] ABSTRACT

A magnetic friction device for permitting one machine member to be moved relative to another by applying a predetermined force and for holding one member in a fixed position when the force is discontinued. One member is magnetically susceptible and has a smooth surface interfacing with but slightly spaced from a surface on the other member. The other member's surface has one or more recesses in which there are magnetic disks of a polymer impregnated with magnetic particles. The disks are attracted to the smooth surface to produce a design controlled predetermined frictional force.

14 Claims, 7 Drawing Figures

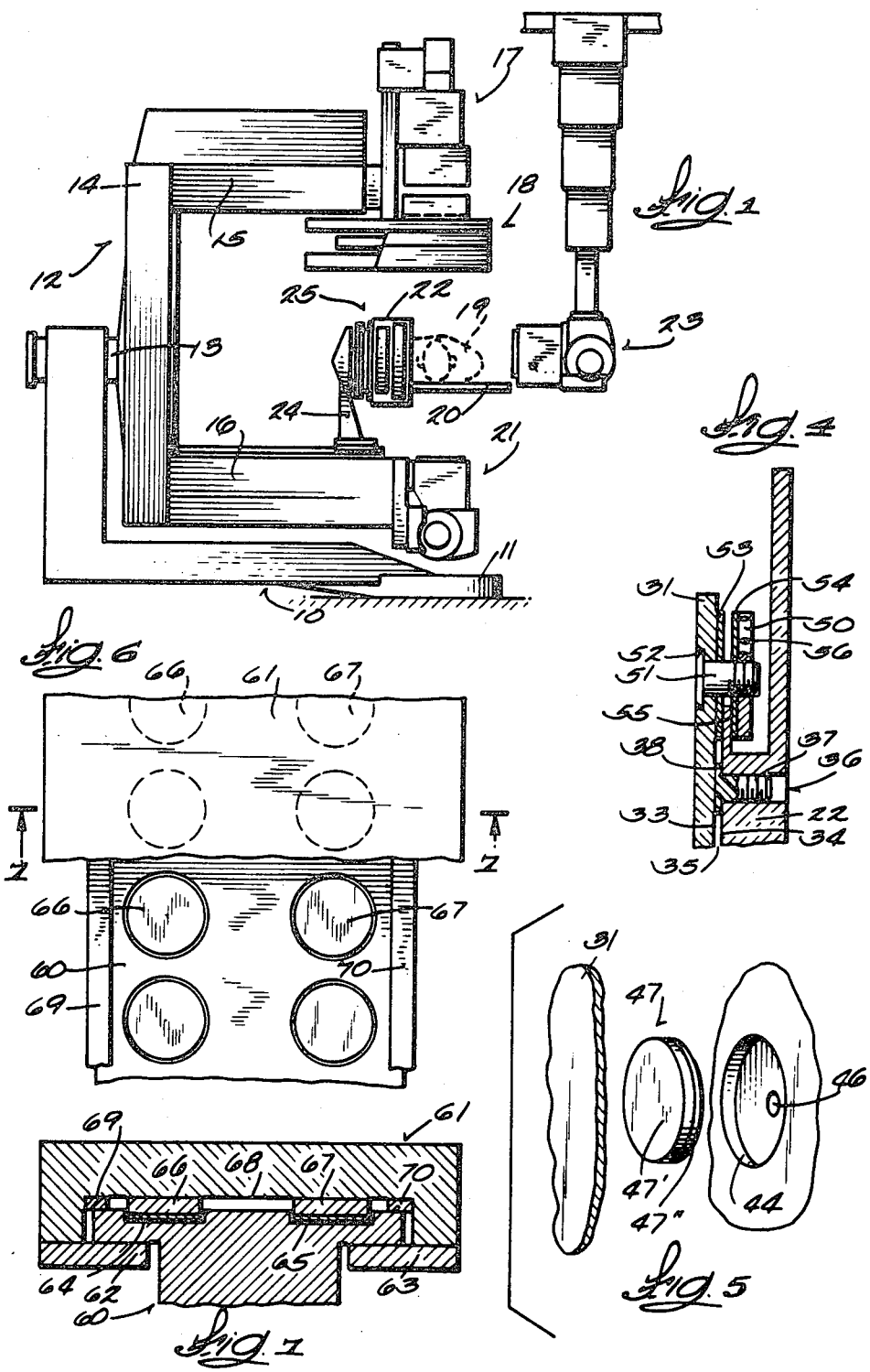

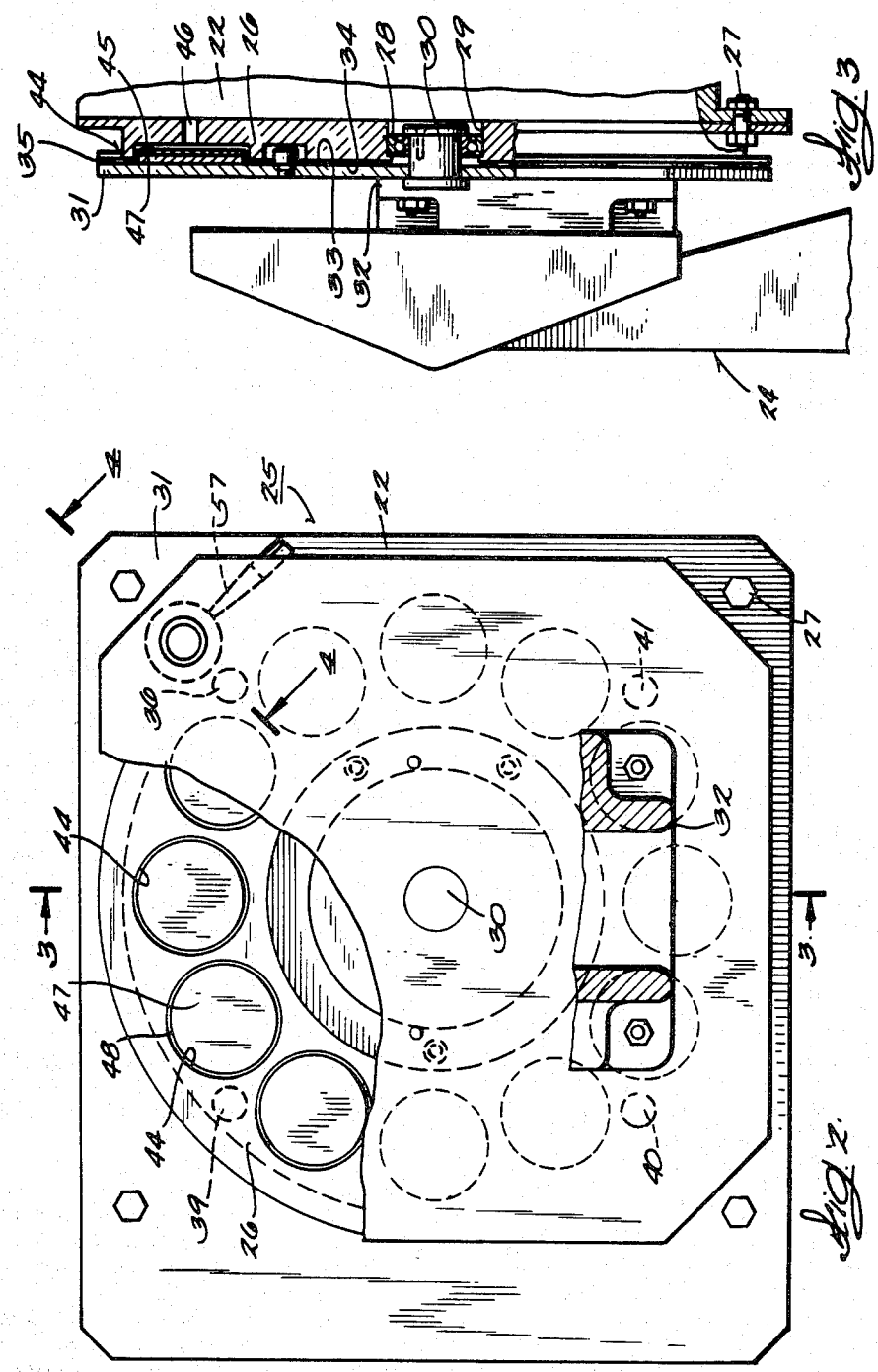

MAGNETIC FRICTION DEVICE

This is a division of application Ser. No. 263,663, filed May 14, 1981, now U.S. Pat. No. 4,417,356.

BACKGROUND OF THE INVENTION

This invention relates to a magnetic friction device for controlling movement of one machine member relative to another.

In some machines it is necessary to be able to move one machine member relative to another by applying a manual force and still have the member remain in the position to which it has been moved when the manual force is discontinued. One known way to achieve this is to mount a movable element on one member that is provided with a brake lining that can be separated from a smooth surface on the other member when it is desired to move one of the members and can be pressed against the smooth surface to create friction for holding one member in the position to which it has been moved. Such known friction devices require a solenoid, fluid or mechanical linkage actuator to press and release the brake lining, thus increasing their complexity and cost.

Another approach is to mount a movable brake lining element on one member and have springs or some other force generating means press the lining against the smooth surface on the other member constantly. Manual force sufficient to overcome friction is applied to one member to move it and friction holds it in the position to which it has been moved. With this kind of device, experience has shown that adjustments of the spring pressure are required periodically to account for the wear and other causes of the frictional force varying with time. A disadvantage of such variations is that excessive manual force may ultimately be required to move a member or the loss of frictional force is so great that the member will move simply under the influence of gravity. In diagnostic x-ray apparatus, for example, difficulty in movement or inadvertent movement of an apparatus component can not only be annoying but hazardous to a patient or other surrounding machine components.

SUMMARY OF THE INVENTION

An object of this invention is to overcome the above-noted disadvantages by providing a magnetic friction generating device whose frictional force is determined exclusively by design of its parts so that no adjustment means are required nor are any adjustments ever necessary.

In accordance with the invention, any two relatively movable apparatus members are held in proximity with each other with a small gap between them but with the ability to move one member in parallelism relative to the other. One member is made of a magnetically susceptible material and has a smooth surface. The other member is made of a nonmagnetic material and has a surface in which there are one or more recesses that face toward the smooth surface on the other member. Flat disks of a polymer that is impregnated with magnetized particles are fit in the recesses closely enough so that they can not slide sideways appreciably but can move for being attracted against the magnetic planar surface. The polymer magnet elements perform the dual functions of being normal force creating means and friction producing means.

The manner in which the above-mentioned object and other more specific objects of the invention are achieved will be evident in the ensuing more detailed description of embodiments of the invention which will now be set forth in reference to the drawings.

DESCRIPTION OF THE DRAWINGS

FIG. 1 is a multiaxial x-ray machine in which a use of the invention is made in connection with manual positioning of a radiographic film changer that is rotatable relative to its support;

FIG. 2 is an isolated front elevation view of the magnetic friction device;

FIG. 3 is a vertical section taken on a line corresponding with 3—3 in FIG. 2;

FIG. 4 is a partial section taken on a line corresponding with 4—4 in FIG. 2;

FIG. 5 is a fragmentary view for illustrating how the polymer magnet elements are mounted;

FIG. 6 is a partial plan view of another embodiment of the invention wherein one object or machine part is translated, rather than being rotated, relative to the other and positioning is controlled by the new magnetic friction device; and FIG. 7 is a vertical section taken on a line corresponding to 7—7 in FIG. 6.

DESCRIPTION OF A PREFERRED EMBODIMENT

The multiaxial x-ray machine depicted in FIG. 1 provides an environment for illustrating a highly advantageous use of the new frictional position controlling device. The apparatus comprises an L-shaped arm 10 that is rotatable about the vertical axis of its floor mounted bearing 11. A U-shaped arm 12 is mounted to the L-shaped arm 10 for rotating about the horizontal axis of its shaft 13. The L-shaped arm is comprised of a base section 14 and two longitudinally extending arm sections 15 and 16. A vertically movable x-ray image intensifier 17 is mounted to one end of arm 15 and a vertically and horizontally movable film changer 18 is mounted below the image intensifier. A patient 19 undergoing x-ray examination is supine upon an x-ray permeable table top 20 the support of which is not shown. An x-ray source 21 is arranged to project a beam through the patient for making a posterior-anterior radiographic image with the film changer 18 or a fluoroscopic image with the image intensifier 17. The U-arm can be turned about the horizontal axis of shaft 13 to enable obtaining angular x-ray views of the patient.

The part of the x-ray apparatus in which the new magnetic friction device is used comprises a radiographic film changer which is generally designated by the reference numeral 22 and is used for making lateral x-ray views. The film changer can be characterized as an elongated rectangular box which has internal mechanism for moving unexposed radiographic film into the image plane and removing it after exposure to an internal location where it will not be further exposed by the x-ray beam. Lateral x-ray views of patient 19 are obtained when an x-ray beam projected from an overhead supported x-ray source 23 penetrates the patient and forms an image on the film in the changer 22. The film changer is mounted for rotation on a horizontal axis. The reason for this is, as is well known, to allow for restoring the length dimension of the changer to a horizontal attitude to compensate for the fact that it goes out of horizontal when the U-arm 12 is rotated in either direction about its horizontal axis to permit making angular x-ray views by cooperation of the other x-ray source 21 with film changer 18, for instance. Then if the radiologist wants to make a lateral view using source 23 and film changer 22, it is desirable for the film changer and the film in it to be horizontal so the anatomy recorded on the film has the same attitude as the horizontal patient. It has been found desirable to have a technician turn the film changer 22 to a horizontal attitude by applying a manual force. This means that the film changer must be rotatable freely enough so that undue manual force is not required and yet the film changer must not rotate so freely that it would rotate by itself when the force is removed or when the U-arm is turned on its axis.

In FIG. 1 the film changer 22 is mounted for rotation on an object such as stand 24. The magnetic friction elements are interposed between object or stand 24 and another object, namely, film changer 22.

A first embodiment of the magnetic friction device 25 will now be described in detail in reference to FIGS. 2 and 3 primarily. This embodiment is for controlling the angular position of two objects or machine parts that rotate relative to each other when a force is applied manually and must stay fixed when the rotating force is discontinued.

In FIG. 3, a fragment of the back side of the film changer 22 is shown. It has a generally circular member 26 secured to it by means of bolts such as the one marked 27. Member 26 is comprised of a nonmagnetic material which, by way of example and not limitation, is desirably aluminum. A ball bearing 28 is mounted in a shouldered central bore 29 of member 26. A shaft 30 is fixed in the inner race of the bearing. Nonmagnetic member 26 turns with the outer race of the bearing. A magnetically susceptible plate member 31 is clamped to the shaft. For brevity, member 31 will be called a magnetic member. The nonrotating magnetic plate or member 31 is anchored to an adapter 32 which is coupled to stand 24. Magnetic member 31 may be made of a ferrous metal such as steel. The surface 33 of magnetic member 31 which faces the surface 34 on nonmagnetic member 26 is planar and smooth.

There is a gap 35 between the planar face 33 of the magnetic material member 31 and the surface 34 of the nonmagnetic material member 26. As can be seen in FIG. 4, the gap is maintained by using some studs such as the one marked 36 which are made of an antifriction material such as nylon. The studs have a threaded shank 37 and an integral flat head 38 whose thickness determines the size of the gap. There are four such studs in this embodiment which are marked 36, 39, 40 and 41 in FIG. 2 which shows how the studs are arranged.

As can be seen in FIGS. 2, 3 and 5 the surface of the nonmagnetic member 26 has a plurality of circular recesses 44 formed in it. There are 12 such recesses in the illustrated design and they are arranged in a circle concentric to the axis of shaft 30. A profile or section of one of the recesses 44 is shown in FIG. 3 where it is evident that the recess has a flat bottom 45 to which a hole 46 through nonmagnetic member 22 extends. A typical recess 44 has a circular magnet element 47 disposed in it. As can be seen in FIG. 3, each magnet element has a flat face for interfacing with the smooth surface on stationary magnetic member 31. In FIG. 2, the gap 48 surrounding circular magnet element 47 is enlarged but, in reality, the magnet element has an outside diameter that is just a little less than the inside diameter of the recess to provide clearance for allowing the vinyl magnet element to move in a direction perpendicular to its plane surface for effecting magnetic engagement with the smooth planar surface 33 on magnetic member 31 but without any lateral freeplay.

As can be seen in FIG. 5, magnet element 47 is comprised of two layers 47' and 47" in this particular design. Layer 47' is a disk of a polymer such as some slightly flexible polyurethane or polyvinyl chloride which is impregnated with fine particles of permanently magnetized material. Polyvinyl chloride or vinyl, for the sake of brevity, disks 47' were used successfully in commercial products. In this particular case, the vinyl magnets 47' are bonded to a ferrous metal plate 47" to enhance magnetic field strength. Before the rotatable magnetic member 26 is assembled to the stationary magnetically susceptible member 31, the magnet elements 47 are deposited in the recesses. After assembly, access is available through the holes 46 in the nonmagnetic member 26 for a tool that is used to push the magnet element to assure that the magnetic vinyl part interfaces firmly with the smooth surface on member 31.

The magnetic attractive force between vinyl surfaced magnetic element 47 and the smooth faced magnetic member 31 results in creating a frictional resistance to rotation of nonmagnetic member 26 relative to stationary magnetically susceptible member 31.

An advantage of the device is that the frictional force that permits and resists rotation can be easily controlled at the time it is designed. There are a number of variables subject to control at this time. For instance, magnet element disks 47 of greater or lesser diameters or thicknesses can be used to obtain the total required frictional force for whatever weight of the object such as the film changer is to be handled by the magnetic friction device. Another way of obtaining just the right amount of frictional or braking force is to put magnet element 47 in only some of the recesses 44. Still another option available for establishing a proper total frictional force is to affect the magnetic field strength of the magnet elements 44 by either having ferrous metal plates such as 47" bonded to some, all or none of the vinyl magnet disks 47'. Accelerated life tests have demonstrated that the magnetic vinyl disks exhibit no wear and will exhibit no wear over a long period of use in installed equipment. A heavy film changer rotated smoothly and with a good feel imparted to the hand of the operators who apply the rotational torque manually. The device is free of backlash and freeplay too.

Some incidental features of the device will now be discussed. For instance, the device is provided with a lock for positively preventing rotation of an object mounted to rotational nonmagnetic member 26 relative to magnetically susceptible member 31. This lock is visible in FIGS. 2 and 4. In FIG. 4 one may see that the lock comprises a disk 50 threaded to a stud 51 that is welded at 52 to magnetically susceptible member 31. A flat stainless steel washer 53 is fitted over the stud and bears against the inside face of member 31. A flat ring or washer of asbestos brake lining material 54 is adhered to metal disk 50. It will be evident that when the metal disk is turned on the thread of stud 51 the high friction asbestos ring will frictionally engage the radially extending rim or flange portion 55 on nonmagnetic member 22 while it is backed up by metal ring 53. The lock actuating disk 50 is provided with a plurality of circumferentially spaced threaded holes which allow the handle 57, see FIG. 2, to be screwed into disk 50 at whatever location results in the handle 57 being easily accessible from the edge of the device. As a practical matter, before the handle is installed, disk 50 is turned on threaded stud 51 during assembly of the device until brake lining ring 54 engages radially extending flange 55 frictionally. Then the handle 57 is screwed into one of the holes of the disk and the disk is turned until the braking force is relieved so that member 26 can turn relative to member 31.

Another embodiment of the magnetic friction device in apparatus wherein two objects or machine parts are arranged for moving translationally and in parallelism relative to each other rather than in rotational parallelism as in the embodiment which has been previously described. In FIGS. 6 and 7, the stationary object is marked 60 and the rectilinearly movable object is marked Movable object 61 is provided with elongated retainer bars 62 and 63 which maintain parts 60 and 61 in engagement but permit part 61 to translate on part 60. The top surface of lowermost stationary part 60 is provided with some recesses such as those marked 64 and 65 which are occupied by magnet elements such as those marked 66 and 67. These magnet elements are similar in composition to those used in the previously discussed embodiment. They are shown attracted to the smooth inside or bottom surface 68 of the movable member 61. Member 61, is of course, composed of or has a surface composed of a magnetically susceptible material such as iron or steel and stationary member 60 is composed of a nonmagnetic material such as aluminum or its alloys or plastic material, for instance. In this embodiment, bars 69 and 70 of low friction material are interposed between movable member 61 and stationary member 60 so that the duty to develop controlled friction is relegated to the polymer magnet elements 66 and 67 and to the other magnet elements if others are used. As in the FIG. 2-5 embodiment, the magnet elements in the FIG. 6 and 7 embodiment have a clearance fit in their recesses sufficient to allow them to move in a direction perpendicular to their planar surfaces but not sufficient to provide any significant freeplay between the peripheries of the magnet elements and the circular interior walls of the recesses.

Although two embodiments of the design controlled and inherently adjusted magnetic friction devices have been described in detail, such description is intended to be illustrative rather than limiting, for the device can be variously embodied and the scope of the invention is to be determined only by interpretation of the claims which follow.

I claim:

1. Apparatus comprising two members that are required to stay in a fixed position relative to each other when a force that has been applied to move one of the members has been discontinued,
   means for holding the members in proximity with each other with a gap between them but permitting one member to move in parallelism relative to the other,
   one of the members having a planar surface defined by magnetic material,
   the other member having a planar surface defined by nonmagnetic material and having a recess presented toward the planar surface of the magnetic material of said one member,
   a permanent magnet element having a planar surface and being contained in the recess of the other member, said element fitting closely within said recess but being movable in a direction perpendicular to its planar surface for being attracted to the magnetic material to develop a frictional force sufficient to prevent movement of one member relative to the other which force must be overcome to move one member relative to the other by manual application of force to one of said members, said magnet element being comprised of a polymer containing magnetized particles.

2. The apparatus according to claim 1 wherein the polymer comprising the magnetic element is a polymer of vinyl.

3. The apparatus according to any one of claims 1 or 2 wherein the planar surface defined by the nonmagnetic material has a plurality of said recesses adjacent each other and each recess has one of said magnet elements in it.

4. The apparatus according to any one of claims 1 or 2 wherein the planar surface defined by nonmagnetic material has a plurality of said recesses adjacent each other and each recess has one of said magnet elements in it, the thicknesses of said elements and the total surface area of said elements being such as to develop a total magnetic strength that will result in the frictional force desired.

5. The apparatus according to any one of claims 1 or 2 including rigid antifriction bearing elements disposed between the surfaces on the respective members for maintaining the width of said gap between the members constant.

6. The apparatus according to claim 5 wherein said antifriction bearing elements are composed of nylon.

7. The apparatus according to any of claims 1 or 2 wherein the one member is composed of ferrous metal and the other member is composed of aluminum.

8. The apparatus according to any of claims 1 or 2 including a ferrous metal plate bonded to a surface on said magnet element opposite of its said planar surface to enhance magnetic field strength.

9. A magnetic brake device that allows rotation of one object relative to another object when a predetermined torque is applied to the one object and holds the one object in a fixed position relative to the other when the torque is removed, comprising:
   a first member for being mounted to one of the objects, said member being composed of magnetic material and having a planar surface,
   a second member for being mounted on the other object and being composed of nonmagnetic material, said second member having a surface in which there are recesses presented toward the planar surface on the first member,
   means for coupling said members for relative rotation and with a gap between their surfaces,
   a permanent magnet elements having planar surfaces in at least some of the recesses, respectively, of the second member, said elements being movable in a direction perpendicular to their planar surfaces for being attracted to the planar surface of the magnetic first member to develop a frictional force sufficient to prevent movement of one member relative to the other which force must be overcome with manual application of force to one member sufficient to produce enough torque to rotate one member relative to the other, said magnet elements being comprised of a polymer containing magnetized particles.

10. The apparatus according to claim 9 wherein the polymer comprising the magnet element is a polymer of vinyl.

11. The apparatus according to any one of claims 9 or 10 wherein said recesses are circular and said magnet elements are circular disks.

12. The apparatus according to any one of claims 9 or 10 including a ferrous metal plate bonded, respectively, to a surface on said magnet elements opposite of their planar surfaces to enhance magnetic field strength.

13. The apparatus according to any one of claims 9 or 10 including a plurality of rigid antifriction bearing elements disposed between said members for sliding relative to said planar surface of the first member and for maintaining the width of the gap between them constant.

14. The apparatus according to any of claims 9 or 10 wherein said recesses are located in a generally circular pattern concentrically around the rotational axis of the members.

* * * * *